(12) United States Patent
Zhang et al.

(10) Patent No.: US 11,906,155 B2
(45) Date of Patent: Feb. 20, 2024

(54) LIGHT SOURCE SYSTEM AND LIGHT-EMITTING DEVICE

(71) Applicant: YLX INCORPORATED, Guangdong (CN)

(72) Inventors: Quan Zhang, Guangdong (CN); Jinjiang Fu, Guangdong (CN); Hui Chen, Guangdong (CN)

(73) Assignee: YLX INCORPORATED, Guangdong (CN)

( * ) Notice: Subject to any disclaimer, the term of this patent is extended or adjusted under 35 U.S.C. 154(b) by 0 days.

(21) Appl. No.: 17/756,115

(22) PCT Filed: Oct. 27, 2020

(86) PCT No.: PCT/CN2020/123802
§ 371 (c)(1),
(2) Date: May 17, 2022

(87) PCT Pub. No.: WO2021/098450
PCT Pub. Date: May 27, 2021

(65) Prior Publication Data
US 2022/0397259 A1 Dec. 15, 2022

(30) Foreign Application Priority Data
Nov. 18, 2019 (CN) .......................... 201911128958.8

(51) Int. Cl.
*F21V 5/00* (2018.01)
*G02B 19/00* (2006.01)
*F21Y 115/10* (2016.01)

(52) U.S. Cl.
CPC .............. *F21V 5/007* (2013.01); *F21V 5/008* (2013.01); *G02B 19/0009* (2013.01); *G02B 19/0066* (2013.01); *F21Y 2115/10* (2016.08)

(58) Field of Classification Search
CPC . G02B 19/0066; G02B 19/0009; F21V 5/007; F21V 5/008
See application file for complete search history.

(56) References Cited

U.S. PATENT DOCUMENTS 7,278,755 B2   10/2007  Inamoto
10,914,439 B2*  2/2021  Campetella ............... F21V 5/04
(Continued)

FOREIGN PATENT DOCUMENTS

CN   102445831 A   5/2012
CN   102518964 A   6/2012
(Continued)

OTHER PUBLICATIONS

ISA China National Intellectual Property Administration, International Search Report Issued in Application No. PCT/CN2020/123802, dated Feb. 1, 2021, WIPO, 6 pages.
(Continued)

*Primary Examiner* — Erin Kryukova
(74) *Attorney, Agent, or Firm* — McCoy Russell LLP

(57) ABSTRACT

A light source system and a light-emitting device are provided. The light source system includes an array of light-emitting diodes, the light-emitting diodes including light-emitting diode chips; a collimating lens group located on a light path of light emitted by the array of the light-emitting diodes, the collimating lens group being configured to collimate light beams emitted by the light-emitting diode chips; and a fly-eye lens arranged on a light path of light outputted from the collimating lens group. The fly-eye lens includes micro lens units corresponding to the light-emitting diode chips, and for at least one light-emitting diode chip of the light-emitting diode chips, an image formed by each of at least one light-emitting diode chip on surfaces of the micro lens units is completely within a surface of one of the (Continued)

micro lens units. A ratio of side lobes is reduced, thereby improving the energy utilization rate.

9 Claims, 16 Drawing Sheets

(56) References Cited

U.S. PATENT DOCUMENTS

| | | |
|---|---|---|
| 2011/0304825 A1 | 12/2011 | Sieler et al. |
| 2012/0242961 A1 | 9/2012 | Miura |
| 2016/0357098 A1 | 12/2016 | Kang et al. |
| 2020/0248890 A1* | 8/2020 | Osaka ................. G03F 7/70075 |

FOREIGN PATENT DOCUMENTS

| | | | |
|---|---|---|---|
| CN | 102692801 A | | 9/2012 |
| CN | 203258423 U | | 10/2013 |
| CN | 103968270 A | * | 8/2014 |
| CN | 103968270 A | | 8/2014 |
| CN | 103968270 B | | 3/2016 |
| CN | 107305315 A | | 10/2017 |
| CN | 207486718 U | | 6/2018 |
| CN | 109812765 A | | 5/2019 |
| CN | 209101217 U | | 7/2019 |
| EP | 3190617 A1 | * | 7/2017 ................ F21S 8/04 |
| JP | H11183867 A | | 7/1999 |
| WO | 2019080506 A1 | | 5/2019 |

OTHER PUBLICATIONS

State Intellectual Property Office of the People's Republic of China, Office Action and Search Report Issued in Application No. 201911128958.8, dated Feb. 3, 2023, 8 pages. (Submitted with Partial Translation).

European Patent Office, Extended European Search Report Issued in Application No. 20889406.3, dated Nov. 15, 2023, Germany, 7 pages.

* cited by examiner

LIGHT SOURCE SYSTEM AND LIGHT-EMITTING DEVICE

CROSS REFERENCE TO RELATED APPLICATIONS

The present application is a U.S. National Phase of International Application No. PCT/CN2020/123802 entitled "LIGHT SOURCE SYSTEM AND LIGHT-EMITTING DEVICE," and filed on Oct. 27, 2020. International Application No. PCT/CN2020/123802 claims priority to Chinese Patent Application No. 201911128958.8 filed on Nov. 18, 2019. The entire contents of each of the above-listed applications are hereby incorporated by reference for all purposes.

TECHNICAL FIELD

The present disclosure relates to the field of lighting technology, in particular to a light source system and a light-emitting device.

BACKGROUND

In the field of lighting, light-emitting diodes (LEDs) are generally used as the light source of the system, and how to further improve an energy utilization rate of the light source of the system has become increasingly important.

SUMMARY

An embodiment of the present disclosure proposes a light source system and a light-emitting device to solve the above problems.

The embodiments of the present disclosure achieve the foregoing purpose through the following technical solutions.

In a first aspect, an embodiment of the present disclosure provides a light source system. The light source system includes an array of light-emitting diodes, the light-emitting diodes including light-emitting diode chips; a collimating lens group located on a light path of light emitted by the array of the light-emitting diodes, the collimating lens group being configured to collimate light beams emitted by the light-emitting diode chips; and a fly-eye lens arranged on a light path of light outputted from the collimating lens group. The fly-eye lens includes micro lens units corresponding to the light-emitting diode chips, and for at least one light-emitting diode chip of the light-emitting diode chips, an image formed by each of the at least one light-emitting diode chip on surfaces of the micro lens units is completely within a surface of one of the micro lens units.

In an embodiment, a number of light-emitting diode chips, each of which emits light beam to form the image on the surfaces of the micro lens units is completely within the surface of one of the micro lens units, accounts for greater than or equal to 30% of a number of all of the light-emitting diode chips.

In an embodiment, an image formed by one of the light-emitting diode chips on the surfaces of the micro lens units has a center coinciding with a center of one of the micro lens units.

In an embodiment, an orthographic projection of one of the micro lens units has a shape of a regular hexagon, and an image formed by one of the light-emitting diode chips on the surfaces of the micro lens units has a shape of a rectangle.

In an embodiment, the image formed by the one of the light-emitting diode chips on the surfaces of the one micro lens units has a short side shorter than a side of the one of the micro lens units, and a long side shorter than a distance between two parallel sides of the one of the micro lens units.

In an embodiment, the image formed by the one of the light-emitting diode chips on the surfaces of the one micro lens units has a short side parallel to two parallel sides of the one of the micro lens units that directly faces towards the one of the light-emitting diode chips.

In an embodiment, the fly-eye lens includes a front fly-eye lens sub-unit and a back fly-eye lens sub-unit, and the back fly-eye lens sub-unit is located at a focal plane of the front fly-eye lens sub-unit.

In an embodiment, an image formed by one of the light-emitting diode chips on a surface of the back fly-eye lens sub-unit is completely within the surface of the back fly-eye lens sub-unit.

In an embodiment, the light source system further including: a condensing lens and a diaphragm. The condensing lens is arranged on a light path of light outputted from the fly-eye lens, and the condensing lens is configured to collect and condense light beams outputted from the fly-eye lens and then guide the condensed light beams to the diaphragm.

In a second aspect, an embodiment provides a light-emitting device including the light source system provided in any one of the above embodiments.

In the light source system and the light-emitting device that are provided by the embodiments of the present disclosure, by controlling an image of the light-emitting diode chip on the surface of the fly-eye lens, the image formed by the light beam emitted by one light-emitting diode chip on the surfaces of the micro lens units is completely within the surface of one of the micro lens units. In this way, the ratio of side lobes in the angular distribution of the light beams emitted by the light-emitting diode chip after passing through the micro lens unit is reduced, and the ratio of the energy of the side lobes to the total energy of the light beams is reduced, thereby effectively improving the energy utilization rate of the light source system.

BRIEF DESCRIPTION OF DRAWINGS

In order to better illustrate the technical solutions in the embodiments of the present disclosure, the following will briefly introduce the accompanying drawings used in the description of the embodiments. Obviously, the accompanying drawings in the following description only depicts some embodiments of the present disclosure. Those skilled in the art can obtain other drawings based on these drawings without creative work.

DESCRIPTION OF EMBODIMENTS

In order to enable those skilled in the art to better understand the solutions of the present disclosure, the technical solutions in the embodiments of the present disclosure will be described in the following in conjunction with the accompanying drawings in the embodiments of the present disclosure. Obviously, the described embodiments are only some of the embodiments of the present disclosure, rather than all the embodiments. Based on the embodiments of the present disclosure, all other embodiments obtained by those skilled in the art without creative work shall fall within the protection scope of the present disclosure.

Figure 1:
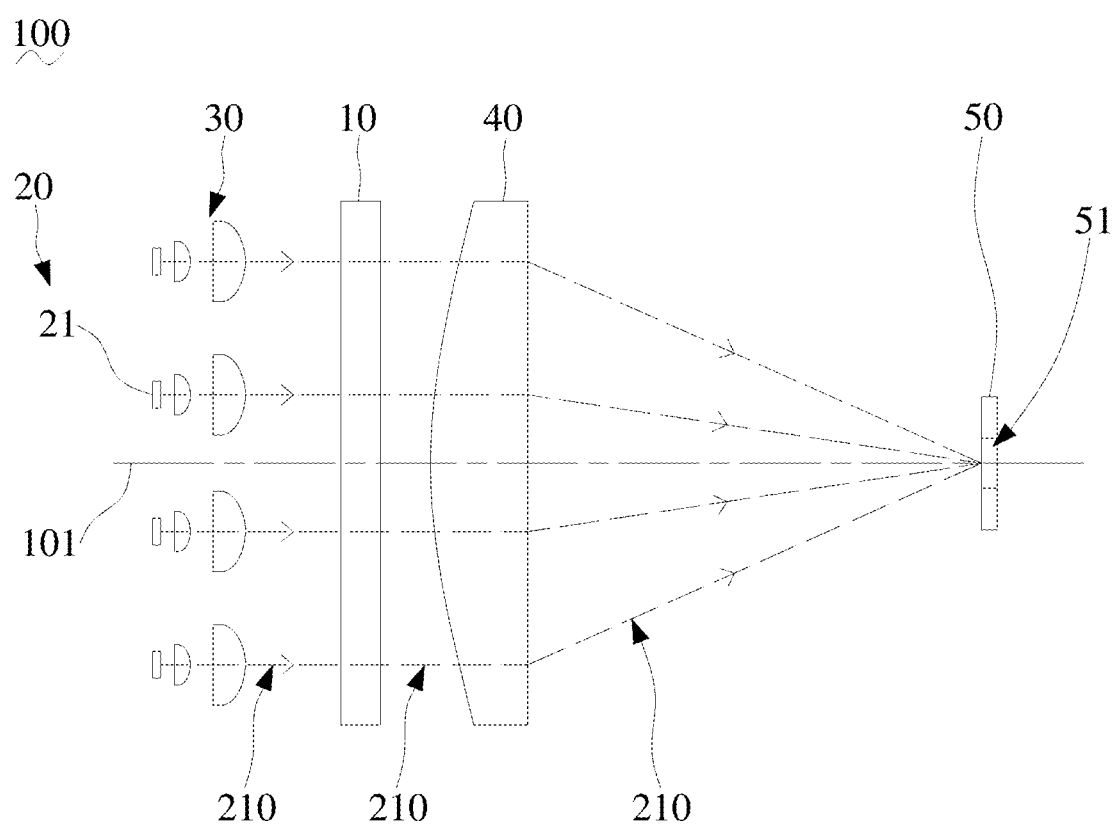
FIG. 1 is a schematic diagram of a light source system provided by an embodiment of the present disclosure.

Referring to FIG. 1, an embodiment of the present disclosure provides a light source system 100. The light source system 100 includes a light-emitting diode (LED) array 20, a collimating lens group 30, and a fly-eye lens 10. The light-emitting diode 20 includes multiple light-emitting diode chips 21. The collimating lens group 30 is arranged on a light path of light emitted by the light-emitting diode array 20. The collimating lens group includes at least two collecting lenses, and each collecting lens corresponds to at least one light-emitting diode chip 21 and is configured to collimate light beams emitted by the light-emitting diode chip. The fly-eye lens 10 is arranged on a light path of light outputted from the collimating lens group, and includes multiple micro lens units 11. For at least one light-emitting diode chips 20 of the light-emitting diode chips 20, the image formed by each of the at least one light-emitting diode chips 20 on surfaces of the micro lens units 11 is completely within a surface of one of the micro lens units.

The light-emitting diode 20 includes multiple light-emitting diode chips 21, and each light-emitting diode chip 21 is configured to emit a light beam 210 with a certain angular distribution. The image formed by the light beam 210 on the surfaces of the micro lens units 11 is completely within the surface of one of the micro lens units 11.

The fly-eye lens 10 is formed by multiple micro lens units 11 that are arranged in an array, and adjacent micro lens units 11 are in close contact with each other. In this way, the light beam 210 can be prevented from exiting from a gap between any two micro lens units 11 to cause energy loss, thereby improving the energy utilization rate of the light source system 100.

The micro lens unit 11 is formed by a square, rectangular, or regular hexagon that can be closely arranged. The light-emitting diode chip 21 has a light-emitting surface, and the light-emitting surface of the light-emitting diode chip 21 has a same shape as the micro lens unit. In an embodiment, the light-emitting surface of the light-emitting diode chip 21 can also have a different shape from the micro lens unit. Since the light-emitting surface of the light-emitting diode chip 21 has a certain area, the light-emitting diode chip 21 is not an ideal mass-point light source. Therefore, the light beam emitted by the light-emitting diode chip 21 is a light beam outputted from a surface light source with a certain angular distribution. When the light beam emitted by the light-emitting diode chip 21 is imaged on the surfaces of the fly-eye lenses, the light beam with a certain angular distribution is converted into an area-distributed light beam. The area-distributed light beam presents a same shape as the light-emitting diode chip 21. In this way, the shape of the light-emitting diode chip 21 is the same as the shape of the micro lens unit, which facilitates the imaging of the light-emitting diode chip 21 within the surface of the fly-eye lens, thereby improving the light utilization rate of the light source system. Specifically, when the light-emitting surface of the light-emitting diode chip has a same shape as the micro lens unit of the fly-eye lens, it is more conducive for the light-emitting diode chip to image within the surface of the micro lens. In this case, the light beam imaged on the surface of the micro lens can completely pass through the subsequent diaphragm through a focus of a condenser lens, thereby improving the light utilization rate of the light source system.

Figure 2:
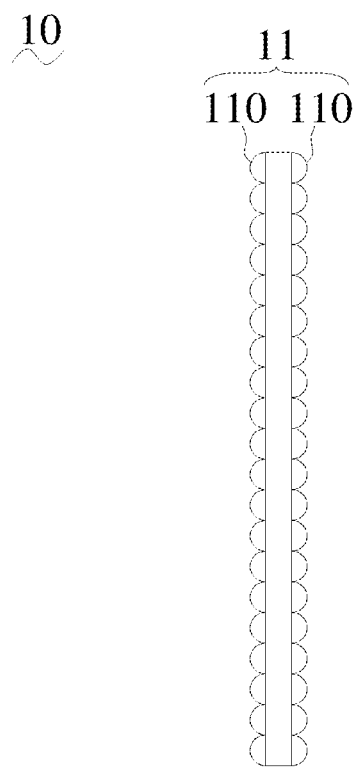
FIG. 2 is a schematic diagram of a fly-eye lens of a light source system shown in FIG. 1.

With reference to FIG. 2, the micro lens unit 11 can include two fly-eye lens sub-units 110 that are arranged at intervals along the light path direction of the light beam 210 emitted by the light-emitting diode chip 21, where a front fly-eye lens sub-unit 110 is arranged at a focal plane of a back fly-eye lens sub-unit 110. Specifically, the front fly-eye lens sub-unit is located between the collimating lens and the back fly-eye lens sub-unit, the back fly-eye lens sub-unit is located between the front fly-eye lens sub-unit and the converging lens, and the light beam 210 emitted by the light-emitting diode chip 21 passes through the two fly-eye lens sub-units 110 for homogenizing light beam, so as to achieve a good light homogenizing effect. In this case, the light-emitting diode chip 20 forms an image on the surface of the back fly-eye lens sub-unit, and the formed image is completed located within the surface of the back fly-eye lens sub-unit.

Referring to FIG. 1, multiple light-emitting diode chips 21 form the light-emitting diode array 20, so that the light source system 100 can form a light spot with a high brightness, and thus the light source system 100 can be applied to stage lamps such as spotlights and reflector lights. The number of the light-emitting diode chips 21 is smaller than or equal to the number of micro lens units 11, and multiple light-emitting diode chips 21 are arranged in an array.

In the light beam 210 emitted by the light-emitting diode chip 21, the light source system 100 can collect, converge, and collimate the light beam 210 by setting the collimating lens group 30 to guide the light beam 210 to the corresponding micro lens unit 11, which not only reduces the loss caused by spreading the light beam 210 out of the micro lens unit 11, but also make the shape of the light beam 210 after being transmitted through the collimating lens group 30 be basically the same as the shape of the light-emitting surface of the light-emitting diode chip 21. In this way, the shape of the light-emitting diode chip 21 can be controlled to form the desired shape of the light beam 210.

Figure 3:
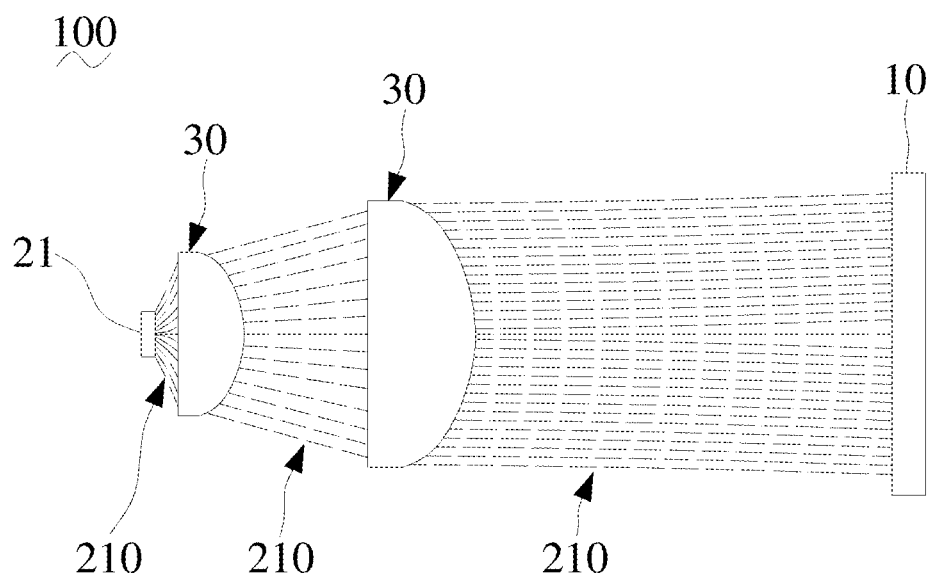
FIG. 3 is a schematic diagram illustrating light beams emitted by a single light-emitting diode chip of the light source system shown in FIG. 1.
Figure 4:
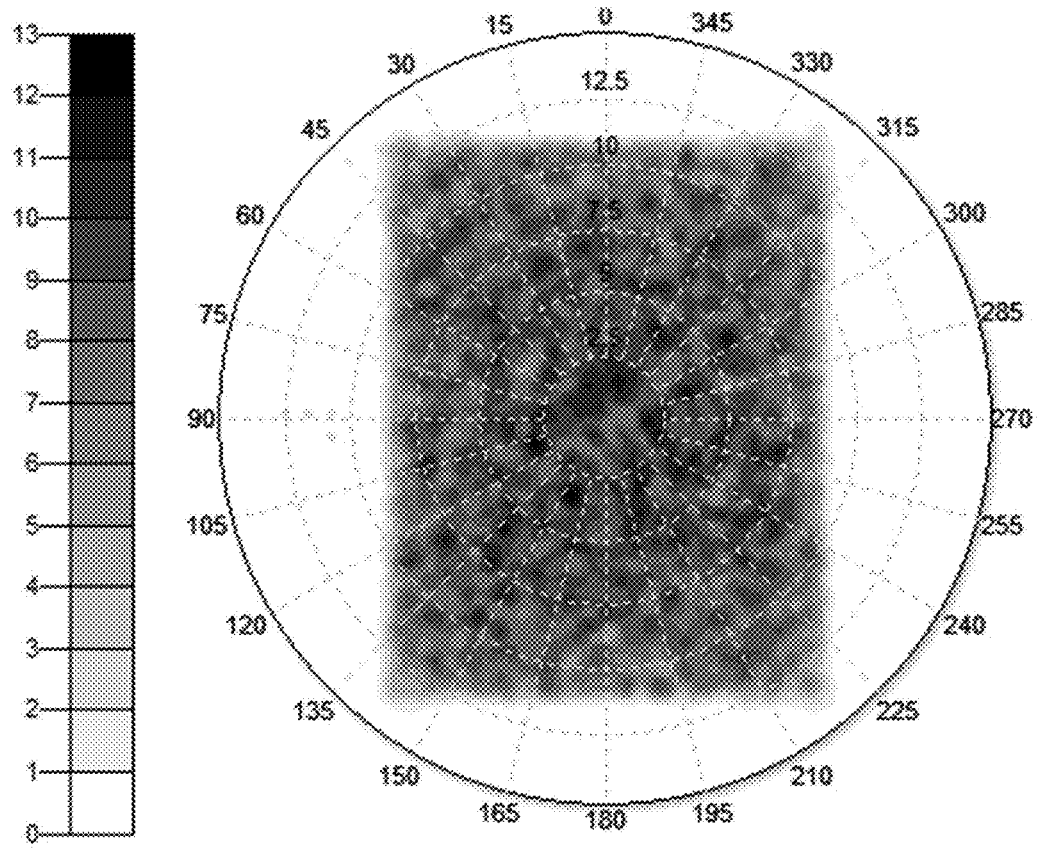
FIG. 4 is a schematic diagram of an energy simulation, obtained by the light source system of FIG. 3, of light beams emitted by a single light-emitting diode chip after passing through a collimating lens.

For example, referring to FIG. 3, the light-emitting diode chip 21 has a cuboid structure, and the collimating lens group 30 is disposed between the light-emitting diode chip 21 and the micro lens unit 11. The collimating lens group 30 can be composed of one or more lenses. The collimating lens group 30 shown in FIG. 3 is composed of two lenses, and the light beam 210 emitted by the light-emitting diode chip 21 is collected, converged, and collimated by the collimating lens group 30 and then guided to the corresponding micro lens unit 11. FIG. 4 illustrates a simulation analysis of an area distribution of the light beam obtained by converting, after passing through the collimating lens group 30, an angular distribution of the light beam emitted by the light-emitting diode chip 21. The energy distribution of the area-distributed light beam has a same rectangular shape as the light-emitting surface of the diode chip 21.

An area located at a left side of the large circle and having a strip shape in FIG. 4 is a light intensity comparison area, and the values in this area are in a unit of light intensity (W/sr), where "W" denotes power, and "sr" denotes steradian. The values located out of the large circle and surrounding the large circle are in a unit of angle value. There are five concentric circles in the large circle that indicate values of 2.5, 5, 7.5, 10, and 12.5 from the inside to the outside. The values inside the large circle have a unit of millimeter.

Figure 5:
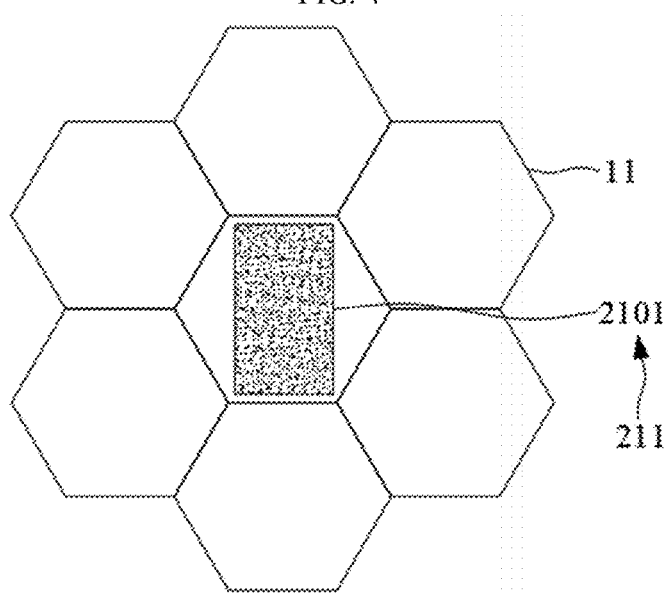
FIG. 5 is a cross-sectional view of light beams emitted by a light-emitting diode chip of a light source system provided by an embodiment of the present disclosure.
Figure 6:
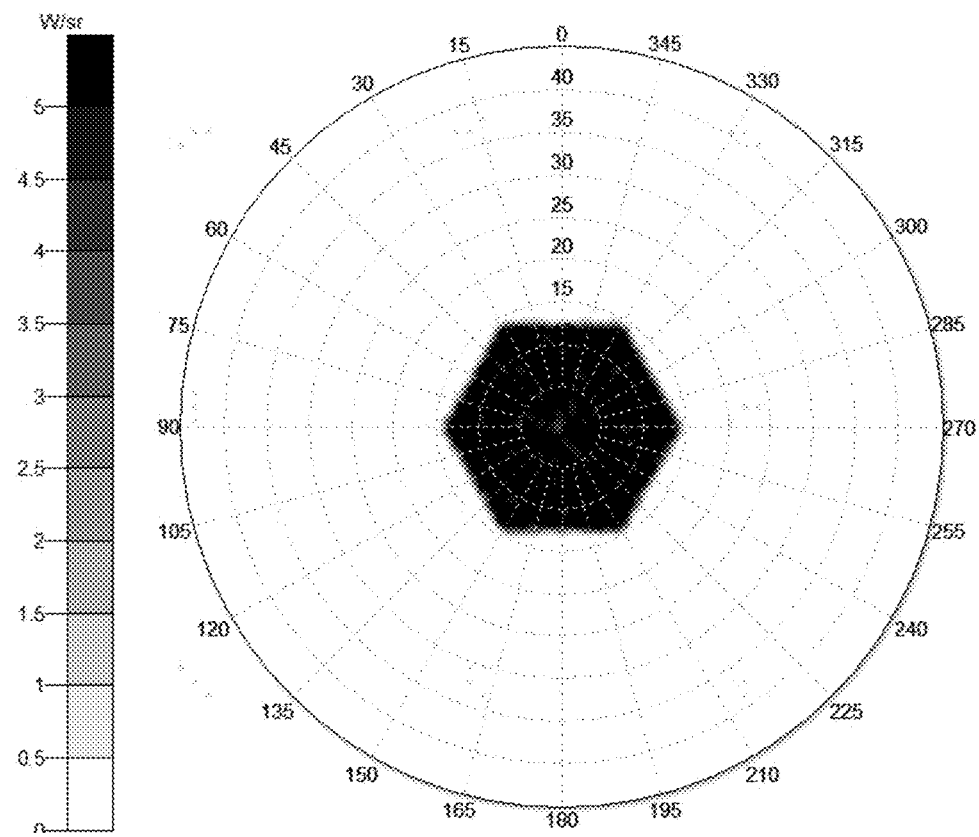
FIG. 6 is a schematic diagram of an energy simulation of light beams obtained by the light-emitting diode chip of the light source system shown in FIG. 5.

In the light beam 210 emitted by one light-emitting diode chip 21, the image formed by the light beam 210 on the surfaces of the micro lens units 11 can be within the surface of one of the micro lens units 11, or can be within surfaces of two or more of the micro lens units 11. The image formed by the light beam 210 on the surfaces of the micro lens units 11 is completely within the surface of one of the micro lens units 11, and in this case, the light beam emitted through the fly-eye lens does not generate side lobes, thereby reducing the loss of light energy. For example, as shown in FIG. 5, the image formed by the light beam emitted by the light-emitting diode chip 211 on the surfaces of the micro lens units 11 is completely within the surface of one of the micro lens units. The simulation analysis of the angle distribution of the light beam outputted from the fly-eye lens is as shown in FIG. 6, in this case, the angular distribution of the light beam 2101 does not generate side lobes. In this case, the light beam can entirely pass through the diaphragm to be utilized, so the energy utilization rate approaches 100%.

Figure 7:
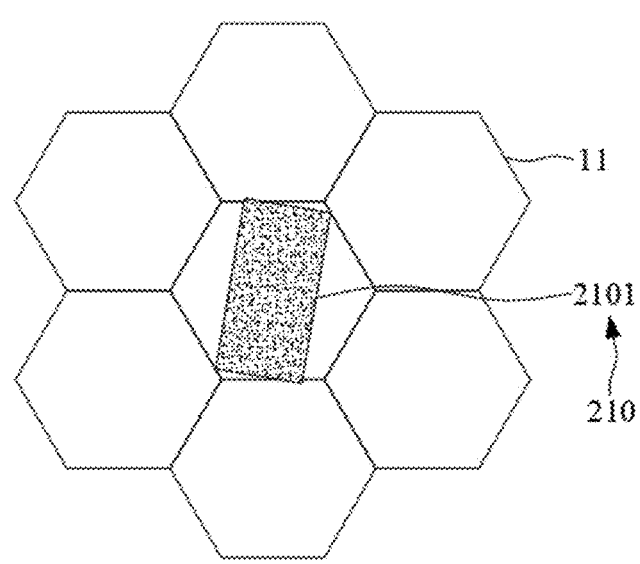
FIG. 7 is a cross-sectional view of light beams emitted by another light-emitting diode chip of a light source system provided by an embodiment of the present disclosure.
Figure 8:
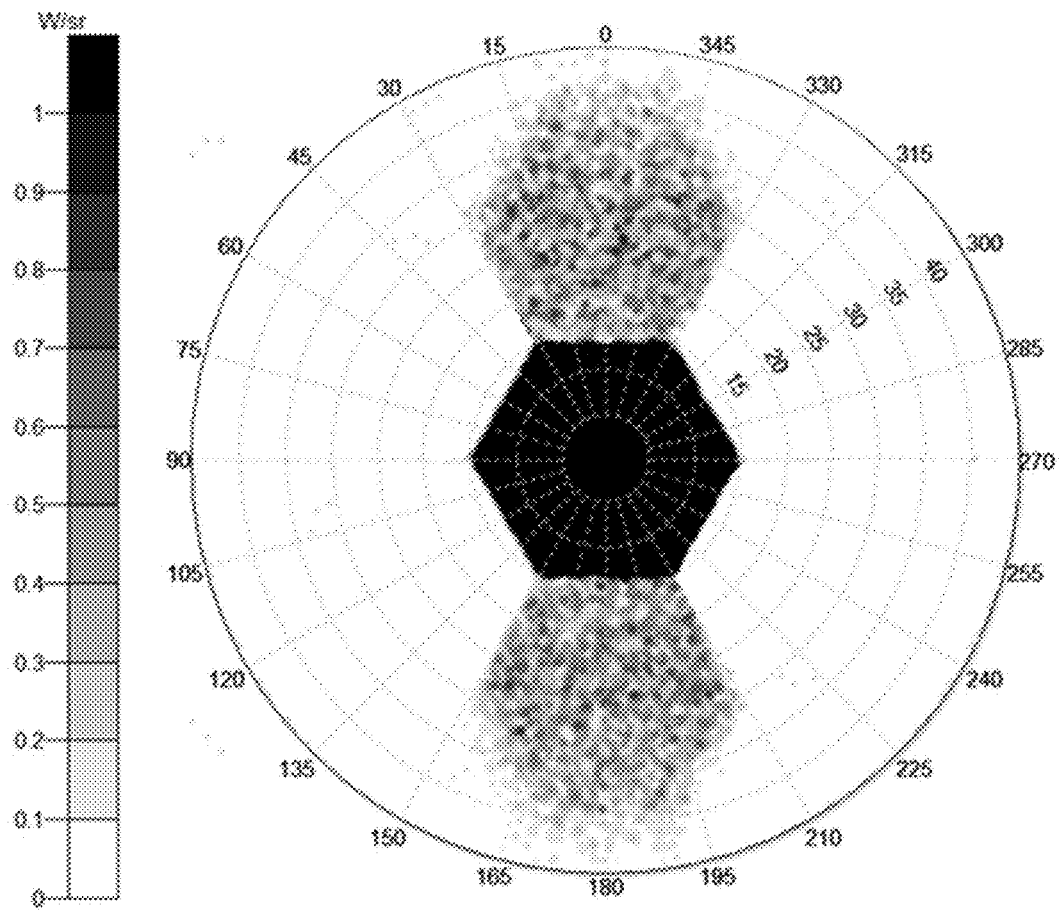
FIG. 8 is a schematic diagram of an energy simulation of light beams obtained by the light-emitting diode chip of the light source system shown in FIG. 7.
Figure 9:
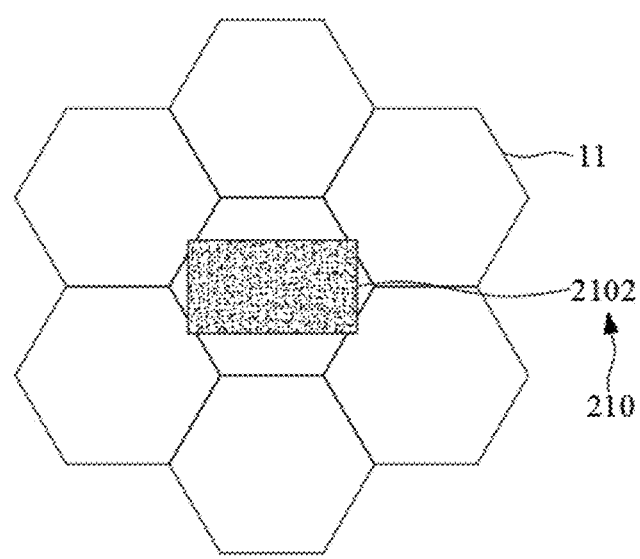
FIG. 9 is a cross-sectional view of light beams emitted by another light-emitting diode chip of a light source system provided by an embodiment of the present disclosure.

When the image formed by the light beam 210 on the surfaces of the micro lens units 11 is within the surfaces of two or more of the micro lens units 11, the side lobes will be generated in the angular distribution of the light beams emitted through the fly-eye lens. In this case, the side lobes of the light beam will not pass through the diaphragm, wasting a part of light energy. For example, as shown in FIG. 7, the image formed by the light beam 210 emitted by the light-emitting diode chip 21 on the surfaces of the micro lens units 11 is within the surfaces of three of the micro lens units 11. Then, after simulation analysis of the angle distribution of the light beam outputted from the fly-eye lens, as shown in FIG. 8, in this case, the angular distribution of the light beam 210 after the light beam 210 passes through the micro lens unit 11 generates side lobes, and the energy utilization rate of the light beam 210 is 98.1%. Or, as shown in FIG. 9, when the image formed by the light beam 210 emitted by one light-emitting diode chip 21 on the surfaces of the micro lens units 11 is within the surfaces of five of the micro lens units 11. After the simulation analysis, as shown in FIG. 10, in this case, the angular distribution of the light beam 210 after the light beam 210 passes through the micro lens unit 11 generates side lobes, and the energy utilization rate of the light beam 210 is 96.4%.

Figure 10:
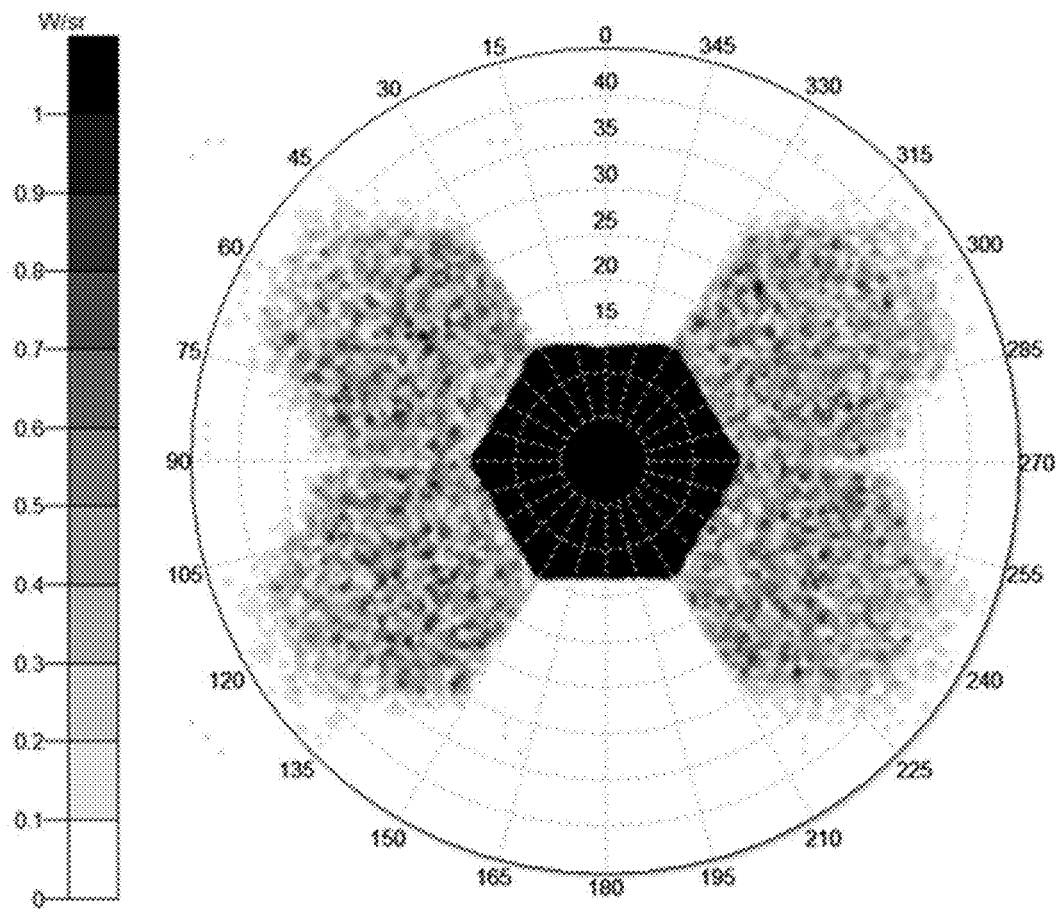
FIG. 10 is a schematic diagram of an energy simulation of light beams obtained by the light-emitting diode chip of the light source system shown in FIG. 9.

As shown in FIG. 6, FIG. 8, and FIG. 10, the area located at the left side of and out of the large circle and arranged in a strip shape is a light intensity comparison area, and the values in this area are in a unit of light intensity (W/sr), where "W" denotes power, and "sr" denotes steradian. The values located out of the large circle and surrounding the large circle are in a unit of angle value. There are five concentric circles in the large circle that indicate values of 5, 10, 15, 20, 25, 30, 35, and 40 from the inside to the outside. The values inside the large circle have a unit of millimeter.

In the light source system 100 provided by the embodiments of the present disclosure, the fly-eye lens 10 and the light-emitting diode 20 are spaced apart from each other, so that the light beam emitted by one light-emitting diode chip 211 in the light-emitting diode array 20 forms an image on the surfaces of the micro lens units 11 that is completely within the surface of one of the micro lens units 11. In this way, the ratio of side lobes generated in the angular distribution of the light beam emitted by the light-emitting diode chip 21 through the micro lens unit 11 is reduced, and the ratio of the energy of the side lobes to the total energy of the light beam is reduced, thereby effectively improving the energy utilization rate of the light source system 100.

In some embodiments, a ratio of the number of light-emitting diode chips 211, each of which emits light beam to form the image on the surfaces of the micro lens units 11 that is completely within the surface of one of the micro lens units 11, to the number of all of the light-emitting diode chips 211 is greater than or equal to 30%.

When there are a lot of light-emitting diode chips 21, it is difficult to ensure that the image formed by the light beam 210 emitted by each light-emitting diode chip 21 on the surfaces of the micro lens units 11 is completely within the surface of one of the micro lens units 11. After research is carries out by the applicant, it is found that when the ratio of the number of light-emitting diode chips 211, each of which emits the light beam to form the image on the surfaces of the micro lens units 11 that is completely within the surface of one of the micro lens units 11, to the number of all of the light-emitting diode chips 211 is less than 30%, the light beam 210 emitted by the light-emitting diode chip 21 produces more side lobes in the angular distribution after the light beam passes through the micro lens unit 11, and the side lobes has a relatively high energy of the total energy of the light beam 210, resulting in a low energy utilization rate of the light source system 100; and when the ratio of the number of light-emitting diode chips 211, each of which emits the light beam to form the image on the surfaces of the micro lens units 11 that is completely within the surface of one of the micro lens units 11, to the number of all of the light-emitting diode chips 211 is greater than or equal to 30%, the ratio of side lobes generated in the angular distribution of the light beam 210 emitted by the light-emitting diode chip 21 after the light beam passes through the micro lens unit 11 is reduced, and the ratio of the energy of the side lobes to the total energy of the light beam 210 is reduced, thereby effectively increasing the energy utilization rate of the light source of the system 100. The ratio of the number of light-emitting diode chips 211, each of which emits light beam to form the image on the surfaces of the micro lens units 11 that is completely within the surface of one of the micro lens units 11, to the number of all of the light-emitting diode chips 211 can be 35%, 40%, 45%, 50%, 55%, 60%, 65%, 70%, 75%, 80%, 90%, 95%, 98%, etc.

Figure 11:
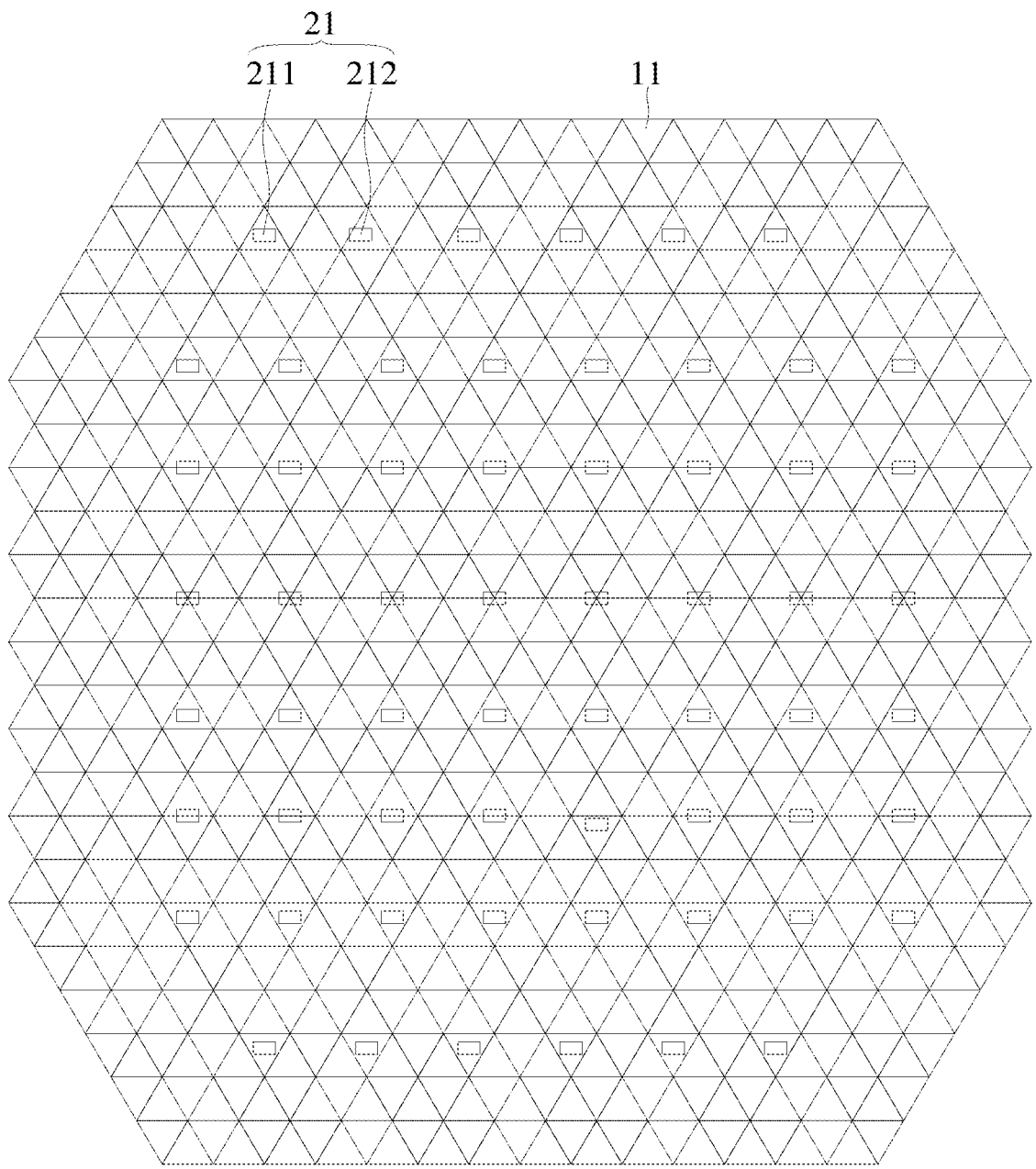
FIG. 11 to FIG. 14 are schematic diagrams of imaging distributions of light beams of micro lens units of light source systems provided by different embodiments of the present disclosure.

For example, the micro lens unit 11 has a regular triangle distribution. FIG. 11 shows an imaging distribution of the light beam of the micro lens unit of the light source system 100. The micro lens unit 11 has a regular triangle shape, the light-emitting diode chip 21 has a rectangular shape, and the number of the micro lens units 11 is 924. The total number of the light-emitting diode chips 21 is 60. The number of the light-emitting diode chips 211, each of which emits the light beam to form the image on the surfaces of the micro lens units 11 that is completely within the surface of one of the micro lens units 11, is equal to 36. Then, the ratio of the number of light-emitting diode chips 211, each of which emits the light beam to form the image on the surfaces of the micro lens units 11 that is completely within the surface of one of the micro lens units 11, to the number of all of the light-emitting diode chips 211 is 60%.

Figure 12:
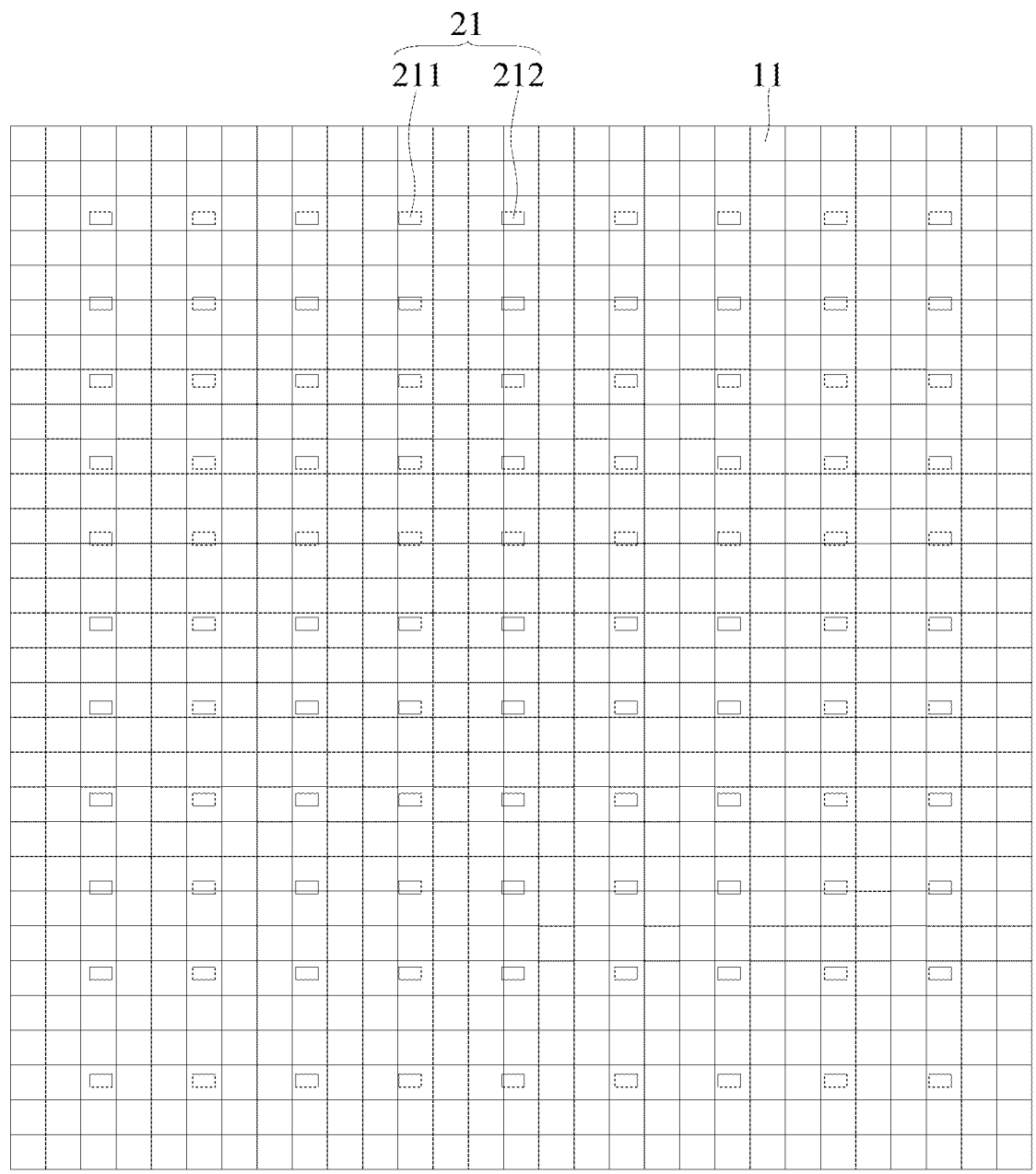

For example, the micro lens unit 11 has a square distribution. FIG. 12 shows an imaging distribution of the light beam of the micro lens unit of the light source system 100. The micro lens unit 11 has a square shape, the light-emitting diode chip 21 has a rectangular shape, and the number of micro lens units 11 is 870. The total number of light-emitting diode chips 21 is 99. The number of light-emitting diode chips 211, each of which emits the light beam to form the image on the surfaces of the micro lens units 11 that is completely within the surface of one of the micro lens units 11, is 64. Then, the ratio of the number of light-emitting diode chips 211, each of which emits the light beam to form the image on the surfaces of the micro lens units 11 that is completely within the surface of one of the micro lens units 11, to the number of all of the light-emitting diode chips 211 is 60%.

Figure 13:
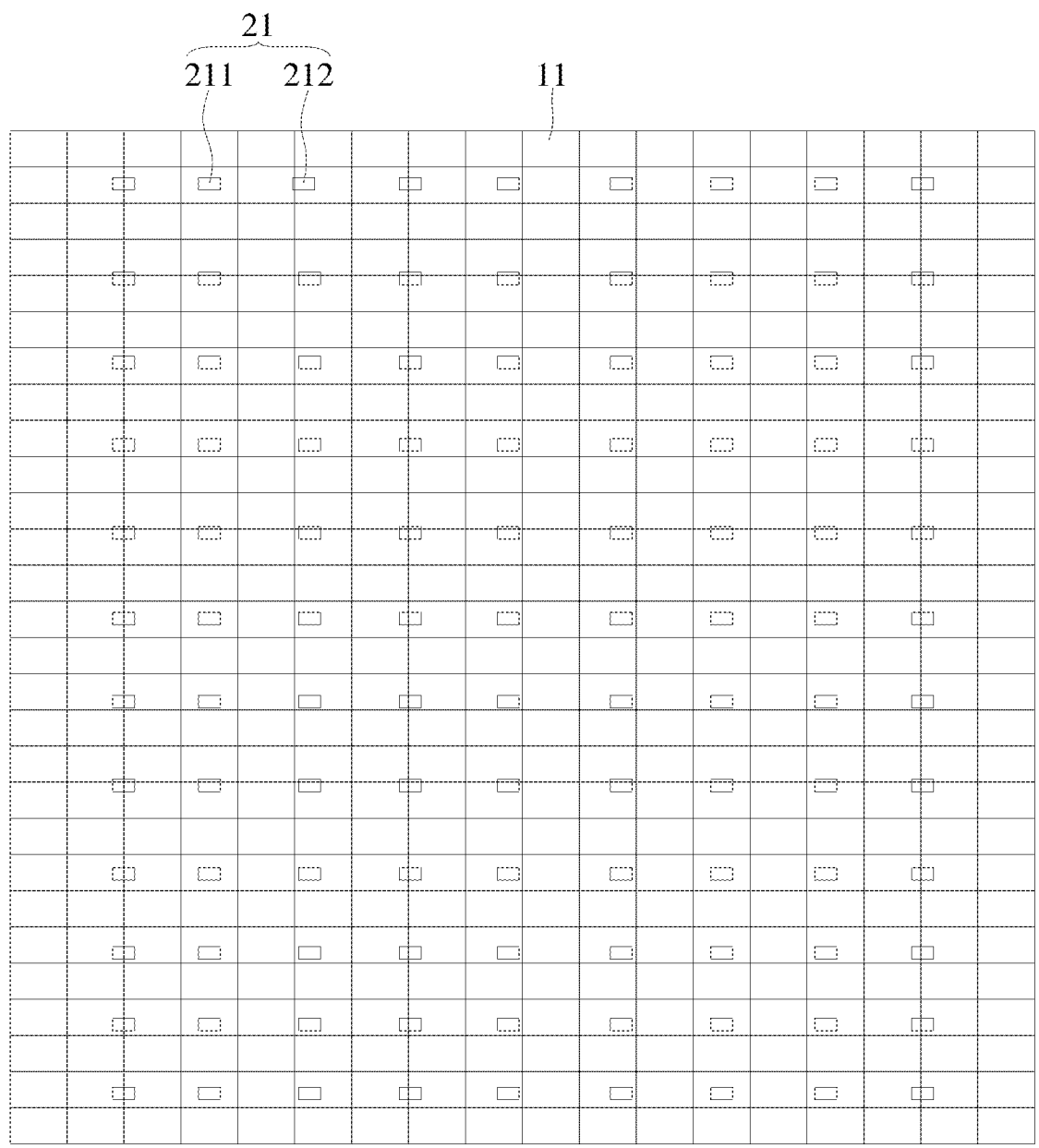

For example, the micro lens unit 11 has a rectangular distribution. FIG. 13 shows an imaging distribution of the light beam of the micro lens unit of the light source system 100. The micro lens unit 11 is rectangular, the LED chip 21 is rectangular, and the number of micro lens units 11 is 504. The total number of light-emitting diode chips 21 is 108. The number of light-emitting diode chips 211, each of which emits the light beam to form the image on the surfaces of the micro lens units 11 that is completely within the surface of one of the micro lens units 11 is 53. Then, the ratio of the number of light-emitting diode chips 211, each of which emits the light beam to form the image on the surfaces of the micro lens units 11 that is completely within the surface of one of the micro lens units 11, to the number of all of the light-emitting diode chips 211 is 49.1%.

Figure 14:
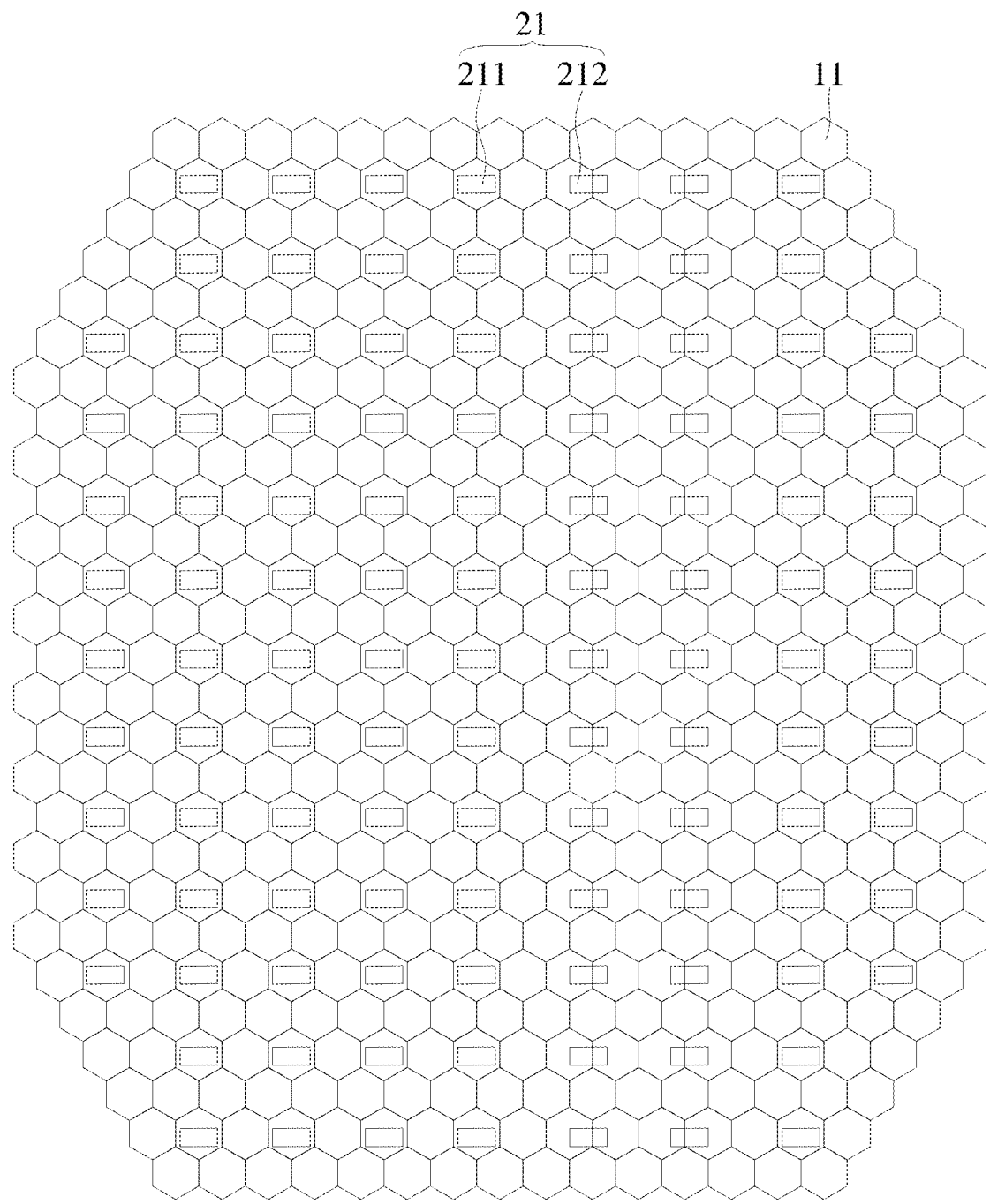

For example, the micro lens unit 11 has a regular hexagonal distribution. FIG. 14 shows an imaging distribution of the light beam of the micro lens unit of the light source system 100. The micro lens unit 11 has a regular hexagonal shape, the light-emitting diode chip 21 has a rectangular shape, and the number of micro lens units 11 is 518, and the total number of light-emitting diode chips 21 is 105. The number of the light-emitting diode chips 211, each of which emits the light beam to form the image on the surfaces of the micro lens units 11 that is completely within the surface of one of the micro lens units 11 is 79. Then, the ratio of the number of light-emitting diode chips 211, each of which emits the light beam to form the image on the surfaces of the micro lens units 11 that is completely within the surface of one of the micro lens units 11, to the number of all of the light-emitting diode chips 211 is 75.2%.

In some embodiments, the image formed by each light-emitting diode chip 211 on the surfaces of the micro lens units 11 is within the surface of one of the micro lens units. Specifically, the light source system includes collection lenses corresponding to the light-emitting diode chips 211 in one-to-one correspondence, and fly-eye lenses corresponding to the light-emitting diode chips 211 in one-to-one correspondence. The positional relationships between the light-emitting diode chips 211, the collection lenses, and the fly-eye lenses are controlled in such a manner that the light beam emitted by the light-emitting diode chip 211 can be controlled to be imaged within the surface of the micro lens unit.

In some embodiments, a center of an orthographic projection of the light-emitting diode chip 211 coincides with a center of an orthographic projection of the micro lens unit 11 directly facing towards the light-emitting diode chip 211. In this way, the light beam 210 emitted by the light-emitting diode chip 21 propagates along a center of the micro lens unit 11 as much as possible, so that it will not easily generate the side lobes in the angular distribution that is formed by the light beam 210 when passing through the micro lens unit 11 due to excessive deviation from the micro lens unit 11 caused by the worker's improper operation on the position of the light-emitting diode chip 21. Therefore, the energy utilization rate of the light source system 100 can be improved.

Referring to FIG. 14, an orthographic projection of the micro lens unit 11 is a regular hexagon, and an orthographic projection of the light-emitting diode chip 211 is a rectangle. Specifically, the number of micro lens units 11 ranges from 500 to 1000, and a side length of the micro lens unit 11 ranges from 1 millimeter to 2 millimeters. For example, the number of micro lens units 11 is 518, and the side length of the micro lens unit 11 is 1.5 millimeters. An aspect ratio of the light-emitting diode chip 21 is 1.28. For example, the light-emitting diode chip 21 has a length of 1.6 millimeter and a width of 1.25 millimeters. A short side of the light-emitting diode chip 21 is shorter than a side of the micro lens unit 11, and a long side of the light-emitting diode chip 21 is shorter than a distance between two parallel sides of the micro lens unit 11. In this way, a whole size of the light-emitting diode chip 21 is smaller than a whole size of the micro lens unit 11, and the light beam 210 emitted by the light-emitting diode chip 21 is more likely to form an image on the surfaces of the micro lens units 11 that is completely within the surface of one of the micro lens units 11.

Figure 15:
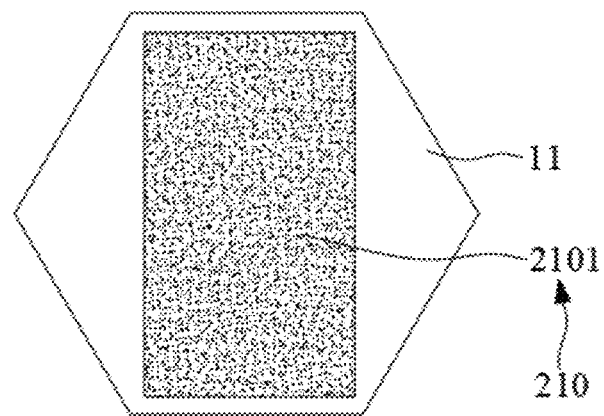
FIG. 15 to FIG. 23 are cross-sectional views of light beams emitted by light-emitting diode chips of light source systems provided by different embodiments of the present disclosure.
Figure 16:
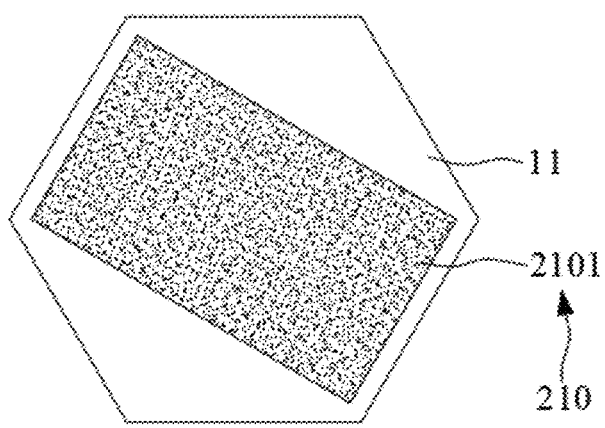
Figure 17:
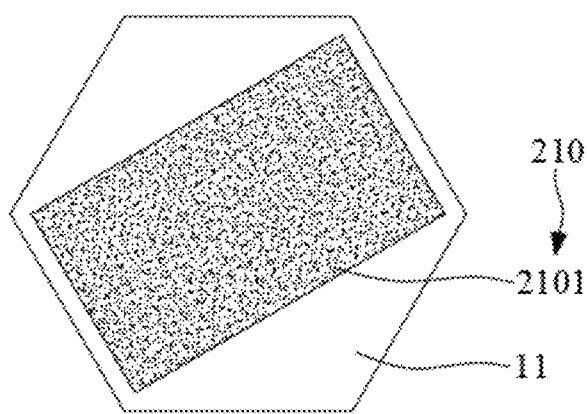

The short sides of the light-emitting diode chip 211 is parallel to two parallel sides of the micro lens unit 11 that is directly facing towards this light-emitting diode chip 211. Specifically, as shown in FIG. 15 to FIG. 17, the light-emitting diode chip 211 and the micro lens unit 11 are arranged in different manners to ensure that the image formed by the light beam 210 on the surfaces of the micro lens units 11 is completely within the surface of one of the micro lens units 11 while the light source system 100 adapts to the light-emitting diodes 20 with different array modes.

Incompletely utilized light beam 2102 is a light beam 210 forming an image on the surfaces of the micro lens units 11 that is within the surfaces of at least two of the micro lens units 11. The light-emitting diode chip 21 that emits the incompletely utilized light beam 2102 is a second light-emitting diode chip 212, and a ratio of the number of second light-emitting diode chips 212 to the number of all of the light-emitting diode chips 21 is greater than 0. A short side of an image of the incompletely utilized light beam 2102 intersects a side of the micro lens unit 11 directly facings towards the incompletely utilized light beam 2102. In this way, in the case where it is ensured that a ratio of the number of light-emitting diode chips 211, each of which emits a fully utilized light beam (the fully utilized light beam forming the image on the surfaces of the micro lens units that is completely within the surface of one of the micro lens units), to the number of all of the light-emitting diode chips 21 is greater than or equal to 30%, the arrangement of the remaining light-emitting diode chips 21 and the micro lens units 11 can be not adjusted, and the light beam 210 emitted by each light-emitting diode chip 21 of the remaining light-emitting diode chips 21 is not required to be adjusted to be completely within the surface of one of the micro lens units 11, thereby being beneficial to reducing the manufacturing difficulty of the light source system 100 and improving the manufacturing efficiency of the light source system 100.

Figure 18:
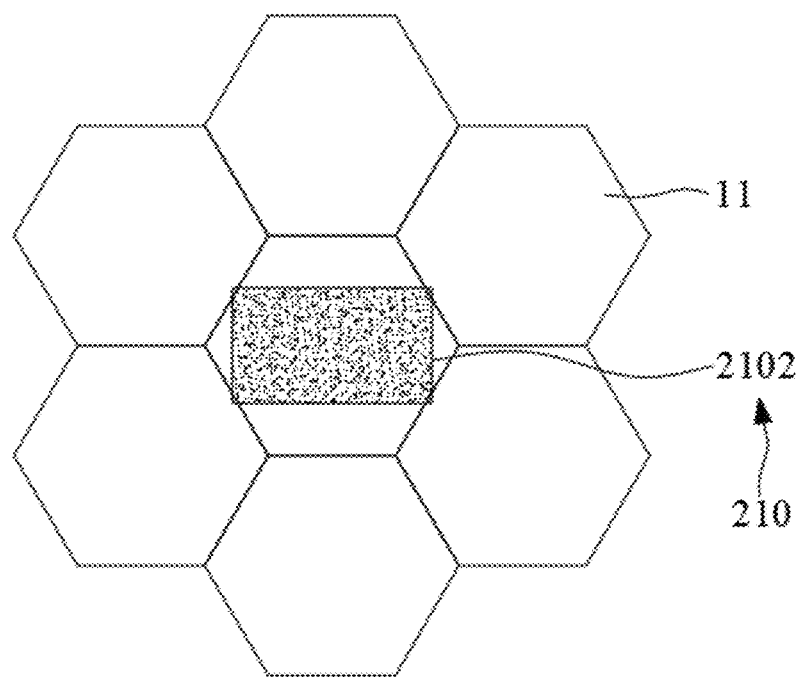
Figure 19:
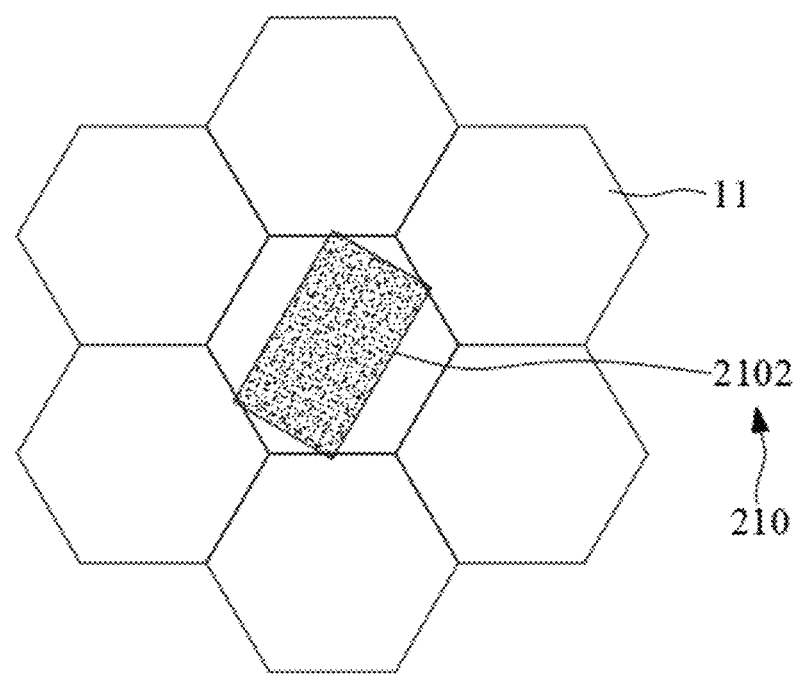
Figure 20:
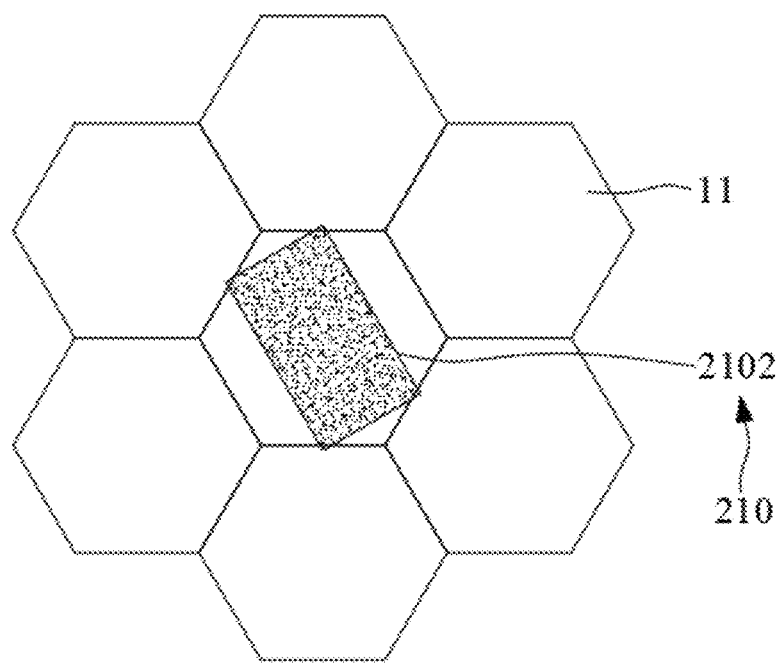
Figure 21:
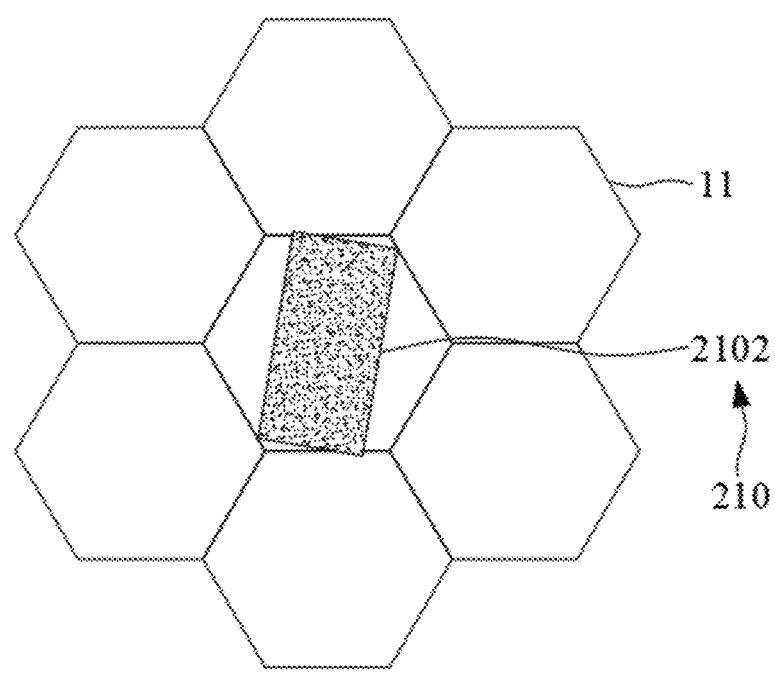
Figure 22:
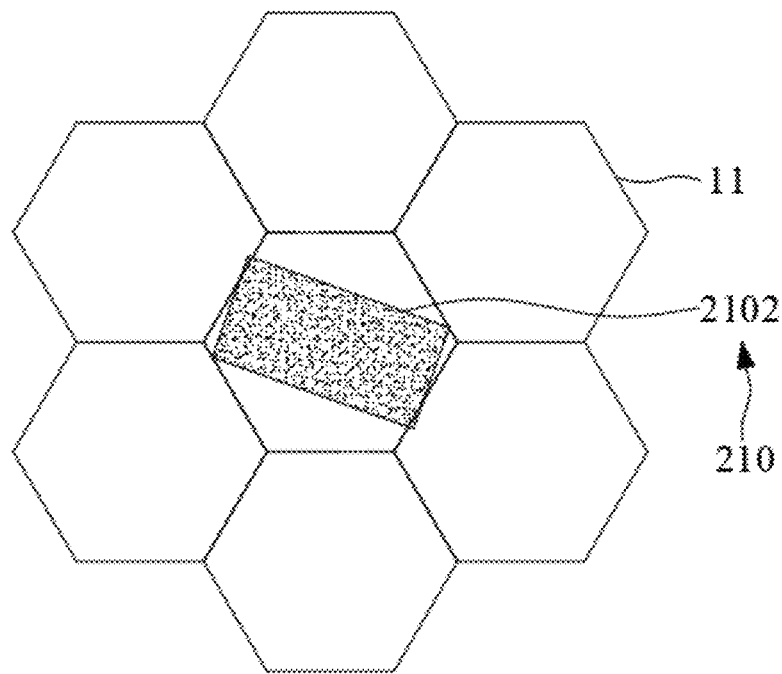
Figure 23:
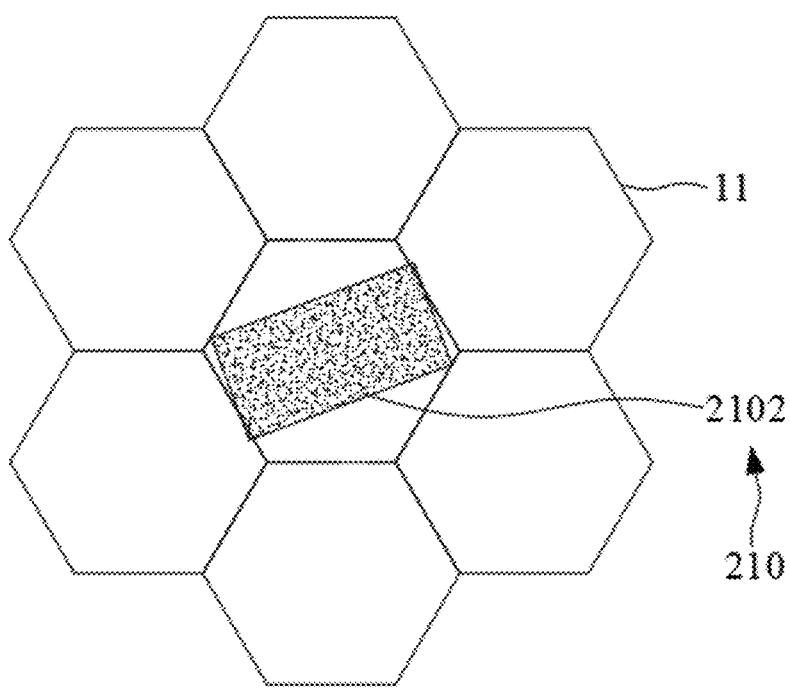

For example, as shown in FIG. 18 to FIG. 20, the short side of the incompletely utilized light beam 2102 is perpendicular to two parallel sides of the micro lens unit 11 directly facing towards the incompletely utilized light beam 2102; or, as shown in FIG. 21 to FIG. 23, diagonal vertices of the incompletely utilized light beam 2102 are respectively located at two parallel sides of the micro lens unit 11 directly facing towards the incompletely utilized light beam 2102. In this way, when the light beam 210 emitted by the second light-emitting diode chip 212 generates the side lobes in the angular distribution after the light beam 210 passes through the micro lens unit 11, and the side lobes has an energy that accounts for a small proportion of a total energy of the light beam 210, it is beneficial to reducing the manufacturing difficulty of the light source system 100 and improving the production efficiency of the light source system 100.

Figure 24:
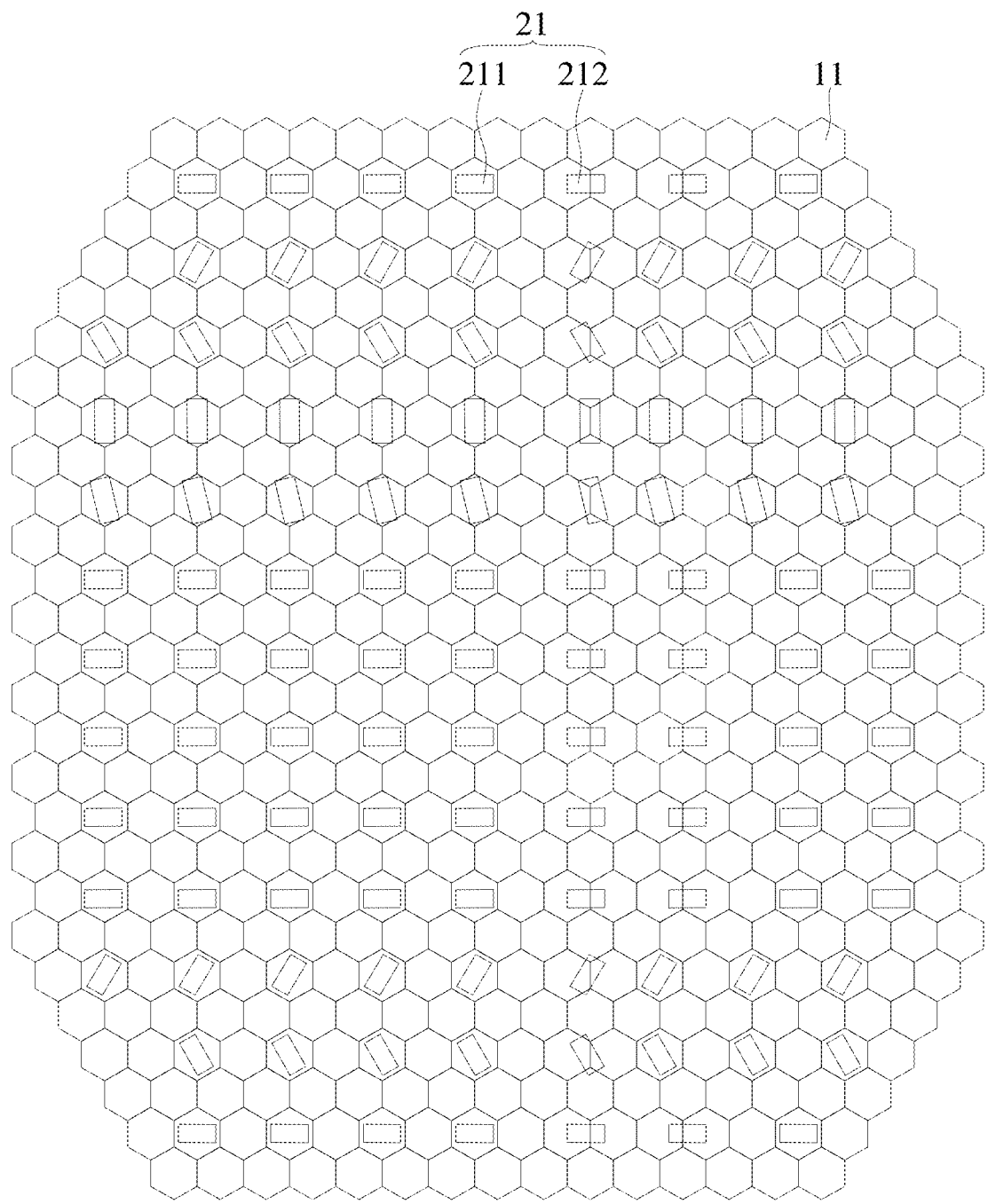
FIG. 24 is a cross-sectional view of a light source system provided by another embodiment of the present disclosure.

In some embodiments, as shown in FIG. 24, in an orthographic projection direction of the light source system 100, the micro lens unit 11 is in a shape of a regular hexagon, the light-emitting diode chip 21 is rectangular, and the light-emitting diode chip 21 and the micro lens unit 11 form various imaging distributions, which includes following cases. The image formed by one of the light-emitting diode chips 21 on the surfaces of the micro lens units 11 is completely within the surface of one of the micro lens units; the image formed by one of the light-emitting diode chips 21 on the surfaces of the micro lens units 11 is within the surfaces of two, three, four, or five of the micro lens units 11; a center of one of the light-emitting diode chips 21 coincides with a center of one of the micro lens units 11; a center of one of the light-emitting diode chips 21 does not coincide with a center of any of the micro lens units 11; the short sides of the image formed by one of the light-emitting diode chips 21 are parallel to two parallel sides of the micro lens unit 11 directly facing towards the one of the light-emitting diode chips 21; the short sides of the image formed by one of the light-emitting diode chips 21 intersect a side of the micro lens unit 11 directly facing towards the one of the light-emitting diode chips 21; the short sides of the image formed by one of the light-emitting diode chips 21 is perpendicular to a side of the micro lens unit 11 directly facing towards the one of the light-emitting diode chips 21; the apex of the image formed by one of the light-emitting diode chips 21 is located at a side of the micro lens unit 11, and so on. In this way, different arrangements are beneficial for the light source system 100 to use the light-emitting diode chips 21 arranged in different array modes while it is not necessary to make the image formed by the light beam 210 emitted by each light-emitting diode chip 21 be completely within the surface of one of the micro lens units 11, thereby beneficial to reducing the manufacturing difficulty of the light source system 100 and improving production efficiency of the light source system 100.

Referring to FIG. 1, the light source system 100 further includes a condensing lens 40 and a diaphragm 50. The condensing lens 40 is disposed between the fly-eye lens 10 and the diaphragm 50. The condensing lens 40 is configured to collect and converge light beams outputted from the fly-eye lens 10 and then guide it to an aperture 51 of the diaphragm 50 and then project it to outside of the light source system 100.

Figure 25:
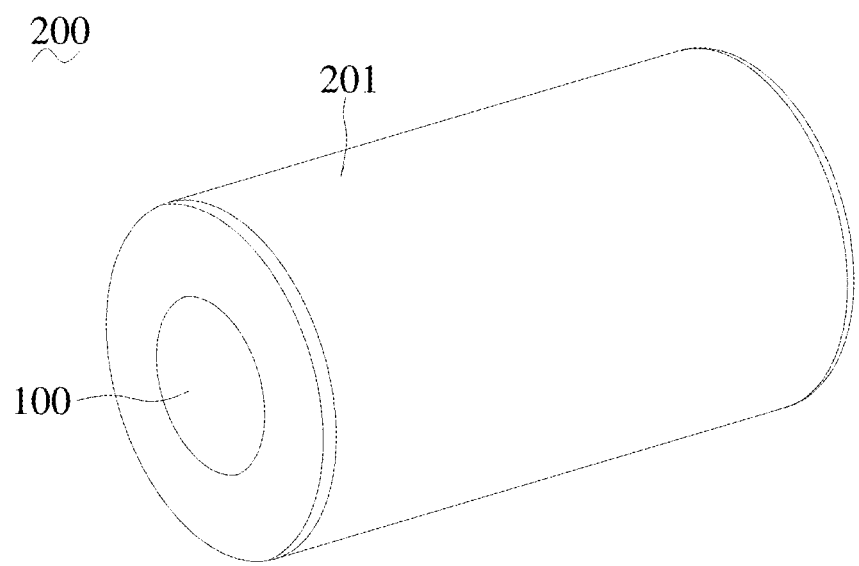
FIG. 25 is a schematic diagram of a light-emitting device provided by an embodiment of the present disclosure.

Referring to FIG. 25, an embodiment of the present disclosure provides a light-emitting device 200, and the light-emitting device 200 includes the light source system 100 provided by any one of the foregoing embodiments.

Specifically, the light-emitting device 200 can be a spotlight, a return light, a cinema projector, an engineering projector, a micro projector, an education projector, a wall-mounted projector, a laser TV, and so on. The light-emitting device 200 further includes a housing 201, and the light source system 100 is disposed in the housing 201, and the housing 201 can protect the light source system 100 and prevent the light source system 100 from being directly impacted by the external environment.

The light-emitting device 200 provided by the embodiments of the present disclosure controls the image formed by the light beam emitted by each light-emitting diode chip on the surfaces of the micro lens units to be completely within the surface of one of the micro lens units, thereby reducing the ratio of the side lobes in the angular distribution of the light beam emitted by the light-emitting diode chip 21 after the light beam passes through the micro lens unit 11, and thus reducing the energy ratio of the side lobes to the total energy of the light beam, thereby effectively improving the energy utilization rate of the light source system 100.

The above embodiments are only used to illustrate the technical solutions of the present disclosure, but not to limit the present disclosure; although the present disclosure has been described in detail with reference to the foregoing embodiments, those skilled in the art should understand that: modification can be made to those technical solutions recorded in the above embodiments, or equivalent replacements can be made to some of the technical features; and the essence of corresponding technical solutions with these modifications or replacements does not deviate from the spirit and scope of the technical solutions of the embodiments of the present disclosure, and these technical solution fall within in the protection scope of the present disclosure.

The invention claimed is:

1. A light source system, comprising:
an array of light-emitting diodes, wherein the light-emitting diodes comprise light-emitting diode chips;
a collimating lens group located on a light path of light emitted by the array of the light-emitting diodes, wherein the collimating lens group is configured to collimate light beams emitted by the light-emitting diode chips; and
a fly-eye lens arranged on a light path of light outputted from the collimating lens group, wherein the fly-eye lens comprises micro lens units corresponding to the light-emitting diode chips,
wherein for at least one light-emitting diode chip of the light-emitting diode chips, an image formed by each of the at least one light-emitting diode chip on surfaces of the micro lens units is completely within a surface of one of the micro lens units, and wherein the fly-eye lens comprises a front fly-eye lens sub-unit and a back fly-eye lens sub-unit, wherein the back fly-eye lens subunit is located at a focal plane of the front fly-eye lens sub-unit.

2. The light source system according to claim 1, wherein a respective light-emitting diode chip, from which a respective image formed by light beams on the micro lens units is completely within one of the micro lens units, accounts for greater than or equal to 30% of a number of all of the light-emitting diode chips.

3. The light source system according to claim 1, wherein an image formed by one of the light-emitting diode chips on the surfaces of the micro lens units has a center coinciding with a center of one of the micro lens units.

4. The light source system according to claim 3, wherein an orthographic projection of one of the micro lens units has a shape of a regular hexagon, and an image formed by one of the light-emitting diode chips on the surfaces of the micro lens units has a shape of a rectangle.

5. The light source system according to claim 4, wherein the image formed by the one of the light-emitting diode chips on the surfaces of the one micro lens units has a short side shorter than a side of the one of the micro lens units, and a long side shorter than a distance between two parallel sides of the one of the micro lens units.

6. The light source system according to claim 4, wherein the image formed by the one of the light-emitting diode chips on the surfaces of the one micro lens units has a short side parallel to two parallel sides of the one of the micro lens units that directly faces towards the one of the light-emitting diode chips.

7. The light source system according to claim 1, wherein an image formed by one of the light-emitting diode chips on a surface of the back fly-eye lens sub-unit is completely within the surface of the back fly-eye lens sub-unit.

8. The light source system according to claim 1, further comprising:

a condensing lens and a diaphragm, wherein the condensing lens is arranged on a light path of light outputted from the fly-eye lens, and the condensing lens is configured to collect and condense light beams outputted from the fly-eye lens and then guide the condensed light beams to the diaphragm.

9. A light-emitting device, comprising a light source system, wherein the light source system comprises:

an array of light-emitting diodes, wherein the light-emitting diodes comprise light-emitting diode chips;

a collimating lens group located on a light path of light emitted by the array of the light-emitting diodes, wherein the collimating lens group is configured to collimate light beams emitted by the light-emitting diode chips; and a fly-eye lens arranged on a light path of light outputted from the collimating lens group, wherein the fly-eye lens comprises micro lens units corresponding to the light-emitting diode chips, and for at least one light-emitting diode chip of the light-emitting diode chips, an image formed by each of the at least one light-emitting diode chip on surfaces of the micro lens units is completely within a surface of one of the micro lens units, wherein the fly-eye lens comprises a front fly-eye lens sub-unit and a back fly-eye lens sub-unit, wherein the back fly-eye lens sub-unit is located at a focal plane of the front fly-eye lens sub-unit.

\* \* \* \* \*